Figure 1:
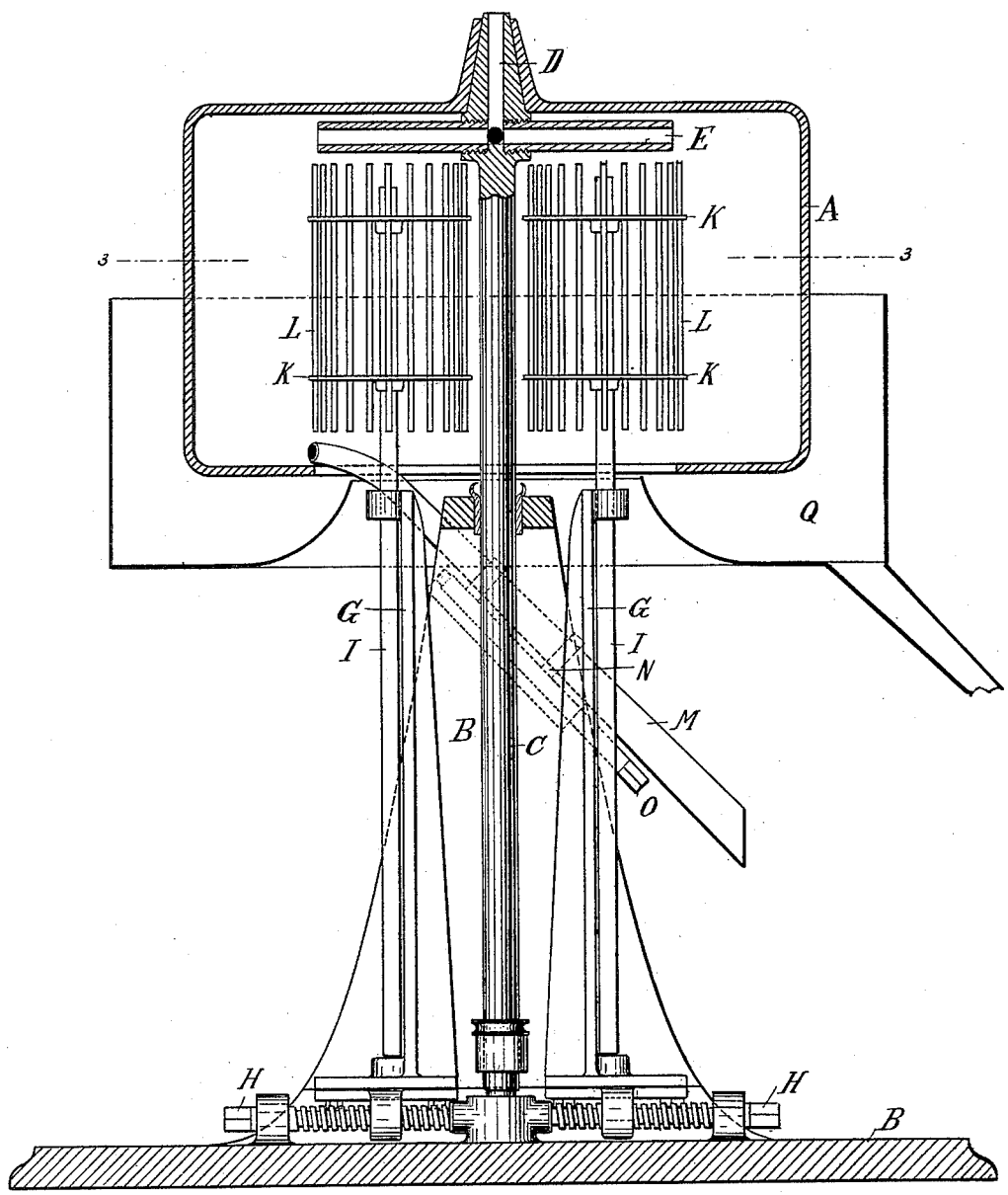

(No Model.) 3 Sheets—Sheet 3.

C. A. JOHANSSON.
METHOD OF EXTRACTING BUTTER FAT FROM MILK.

No. 399,618. Patented Mar. 12, 1889.

WITNESSES:

INVENTOR:

UNITED STATES PATENT OFFICE.

CARL AUGUST JOHANSSON, OF STOCKHOLM, SWEDEN.

METHOD OF EXTRACTING BUTTER-FAT FROM MILK.

SPECIFICATION forming part of Letters Patent No. 399,618, dated March 12, 1889.

Application filed March 22, 1887. Serial No. 231,946. (No model.) Patented in England March 15, 1888, No. 3,994.

*To all whom it may concern:*

Be it known that I, CARL AUGUST JOHANSSON, a subject of the King of Sweden, and a resident of Stockholm, Sweden, have invented certain new and useful Improvements in a Method of Extracting Butter-Fat from Milk, (for which I have obtained a patent in Great Britain March 15, 1888, No. 3,994,) of which the following is a specification.

My invention relates to a method of separating the butter-fat from milk; and the object of my invention is to separate, collect, and remove the butter from fresh milk, leaving fresh skim-milk or blue milk, and not "buttermilk," as is obtained as a residue by the ordinary process of "churning,"

Fresh milk, as is well known, consists of "blue milk" and butter-fat, the latter being distributed through the blue milk uniformly in the form of exceedingly minute globules, the compound forming a sort of emulsion. The specific gravity of the blue milk is greater than that of the butter-fat, and when the milk is submitted to centrifugal action in an ordinary centrifugal "creamer" the greater portion of the blue milk is separated and the globules of butter-fat crowded more closely together. These globules are too closely massed together to be fully displaced by the particles of blue milk by the centrifugal force, and thus these particles of blue milk held mingled with the butter globules form a compound known as "cream." When this cream is "churned" by the ordinary methods, the resultants are butter and buttermilk. The only function of the ordinary centrifugal creamer is to divide the milk into blue milk and cream, and this cream must be afterward churned to produce butter, and, so far as I am aware, some lactic fermentation must take place in the milk in order to effect the separation of the butter by churning the cream.

By my method I extract from the fresh milk in a continuous manner substantially the whole of the butter-fat, leaving as a residue fresh skim-milk without any appreciable lactic fermentation.

In carrying out my invention I employ a modified form of centrifugal apparatus somewhat like that usually employed in creameries. The fresh milk is introduced at the top of the drum through radial inlets and is at once thrown outward toward the periphery of the drum, the heavier particles of the blue milk displacing or crowding aside the butter globules and causing the latter to become crowded together and to hold the particles of blue milk which are thus incarcerated and prevented from escaping. These butter globules and the blue-milk particles retained between them form an inner cream wall. In order to separate the butter from the cream in this cream wall or stratum of the annular mass, the apparatus is provided with a trundle-wheel, which is mounted on a shaft arranged parallel with the shaft of the centrifugal apparatus. This trundle-wheel stands inside of the drum, and its periphery enters the cream wall. It is free to rotate, and the rapidly-revolving cream in the drum carries it around at nearly the same speed as that imparted to the cream. The entry of the staves of the trundle-wheel into the cream wall and their withdrawal therefrom effects a sufficient agitation of the cream to cause the butter globules to separate and allow the particles of blue milk to escape from between them, and afterward, as these globules sink down toward the outlet, they are enabled to coalesce and form a mass of pure butter, wholly freed from blue milk. The function of the trundle-wheel is that of a revolving separator, to part the globules of butter and permit the centrifugal force to act upon and drive out the particles of blue milk thus freed; alone, the centrifugal force will not suffice to free these particles. As the butter sinks down, the particles of milk are gradually removed therefrom, and by the time it reaches the delivery-point at the bottom it will be a mass of pure butter. This mass of butter is removed as fast as it forms by a stationary pipe, the end of which is arranged to cut out and lead off the butter; or, in another form of centrifugal machine, the butter-mass, as it sinks down, flows out of itself over the lower margin or lip of the drum. The blue milk, which is simply sweet skim-milk, containing only a trace of butter, may be led off from the machine in the same way that it is led away from the creamers in common use.

In carrying out my process the fresh milk may be fed into the apparatus continuously and the extraction of the butter therefrom kept up as long as the supply of milk is maintained.

The advantages of my process are these: The butter may be extracted in as short a time and with as little expenditure of power as cream is now separated from the blue milk. The butter product is absolutely pure and free from the germs of fermentation. The milk product is fresh skim-milk, also pure and free from lactic fermentation, and not buttermilk. The process is continuous, and may be carried on as long as the supply of fresh milk is maintained, and the milk may be treated while perfectly fresh and new, and no delay or heating is needed.

In the accompanying drawings I have shown an apparatus adapted for carrying out my process; but of course any apparatus suited to the purpose may be employed.

Figure 2:
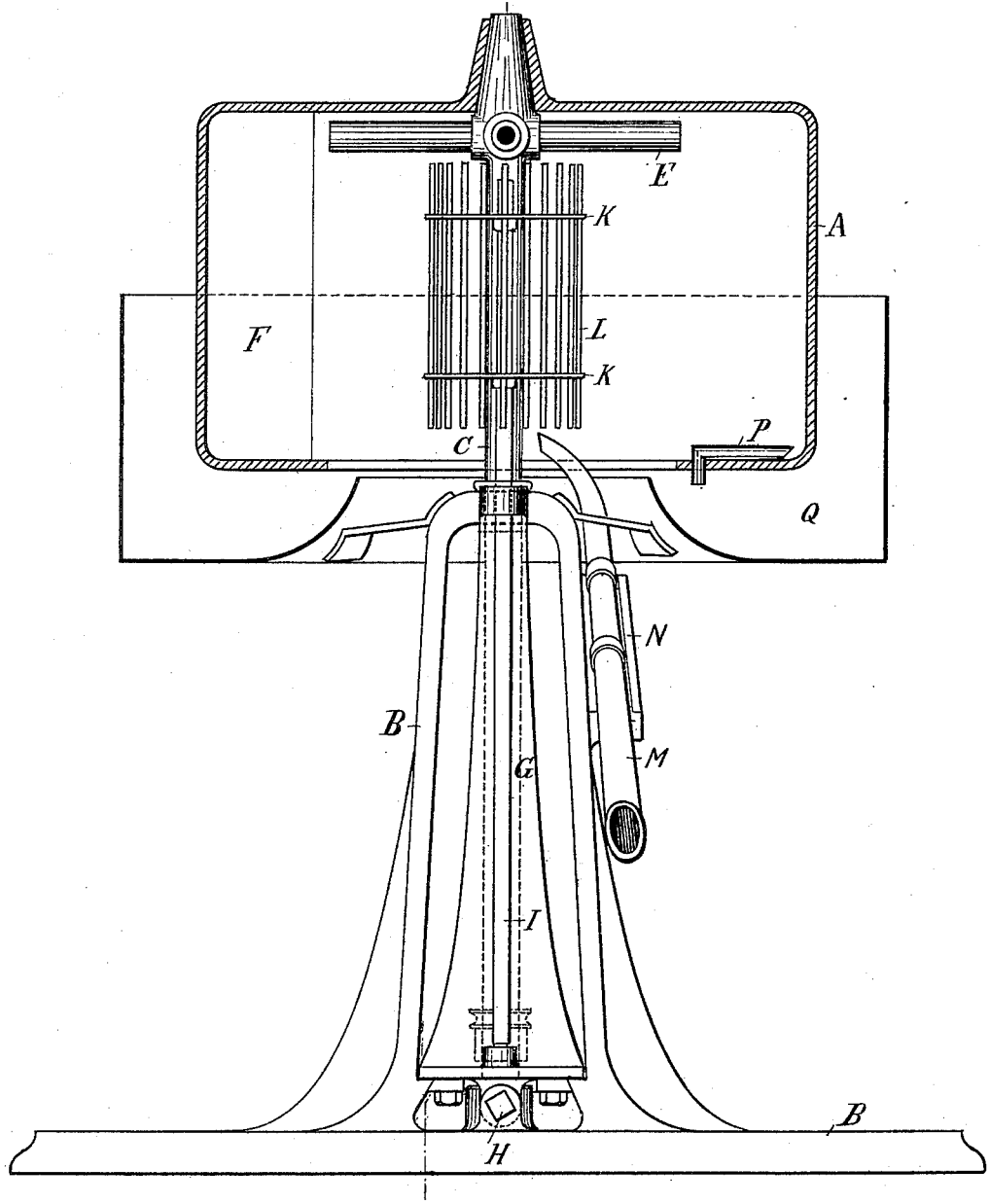
Figure 3:
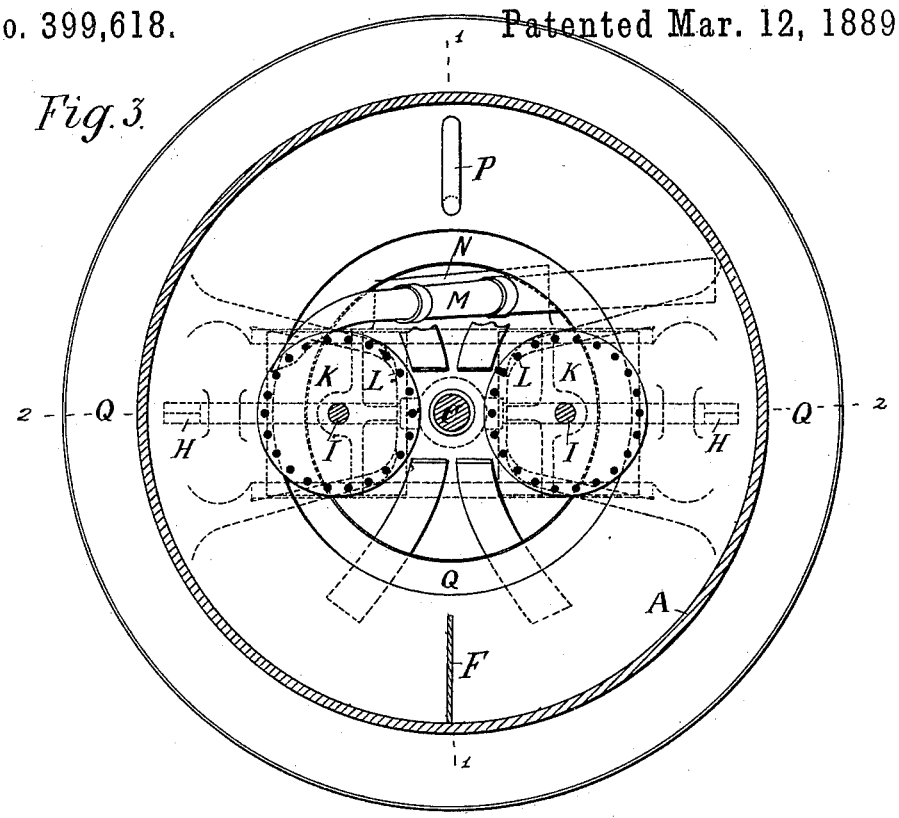

In the drawings, Figures 1 and 2 are vertical axial sections of the apparatus, the planes of the sections being taken at right angles. These respective planes are indicated by the lines 1 1 and 2 2 in Fig. 3. Fig. 3 is a horizontal section of the apparatus in the plane indicated by line 3 3 in Fig. 1.

I will briefly describe this apparatus.

A is the drum of the centrifugal apparatus, open at its bottom and mounted on the upper end of a shaft, C, which has a bearing in a base or stand, B. The fresh milk is admitted to the upper part of drum A through an axial inlet, D, having radial branches E. Rotary motion is imparted to the milk by a wing, F, in the drum. The drum may be driven by the usual means employed with this class of centrifugal apparatuses. Smaller stands or brackets G are arranged in the stand B, and these are adapted to slide in and out on said stand B. By means of adjusting-screws H these stands may be moved inward toward the shaft C, or outward therefrom. In each stand G is rotatively mounted a shaft, I, the end of which projects up into the drum A. On the upper ends of the shafts I are fixed trundle-wheels, each of which consists of two heads or disks, K, and staves L. The trundle-wheels need not extend up into the drum as far as represented, as their work is performed mainly at the lower part of the drum, and there may be only one of such wheels.

By means of the adjusting-screws H the staves or blades of the trundle-wheel may be made to enter the cream wall to the proper depth.

In the apparatus illustrated in the drawings the butter is removed, as fast as it is extracted and sinks down, by means of a pipe, M, which stands inclined and has its upper end inserted at the opening in the bottom of drum A. In order that the position of the pipe M may be properly varied, it is attached to a slider, N, and provided with an adjusting-screw, O.

It will be understood that as the butter is extracted by the method described it sinks slowly down, being removed at the bottom, and added to from above. The blue milk flows from the drum through a pipe, P, into the exterior receptacle, Q.

Having thus described my invention, I claim—

1. The improvement in the art of obtaining butter-fat from milk, which consists in subjecting the milk to centrifugal action in a rapidly-revolving drum and simultaneously therewith separating the particles of the inner layer of the mass, as set forth, whereby the blue milk within said layer is set free and is driven off by centrifugal force and the butter globules are allowed to coalesce.

2. The improvement in the art of obtaining butter-fat from milk, which consists in subjecting the milk to centrifugal action in a rapidly-revolving drum and simultaneously therewith separating the particles of the inner layer of the mass, as set forth, whereby the blue milk within such layer is set free and is driven off by centrifugal force and the butter globules are allowed to coalesce, continuously removing the blue milk and also continuously removing the butter as it sinks by gravity, substantially as specified.

3. The improvement in the art of obtaining butter-fat from milk, which consists in continuously feeding the milk into a rapidly-revolving drum in which it is submitted to centrifugal action, separating the particles of the inner layer of the mass within such drum, whereby the blue milk in such layer is set free and is driven off by centrifugal force and the butter globules are allowed to coalesce and sink by gravity, and continuously removing the blue milk and also continuously removing the butter from the drum, substantially as specified.

In testimony whereof I affix my signature in presence of two witnesses.

CARL AUGUST JOHANSSON.

Witnesses:
 NERE A. ELFWING,
 CARL WENDELIN.